Figure 1:
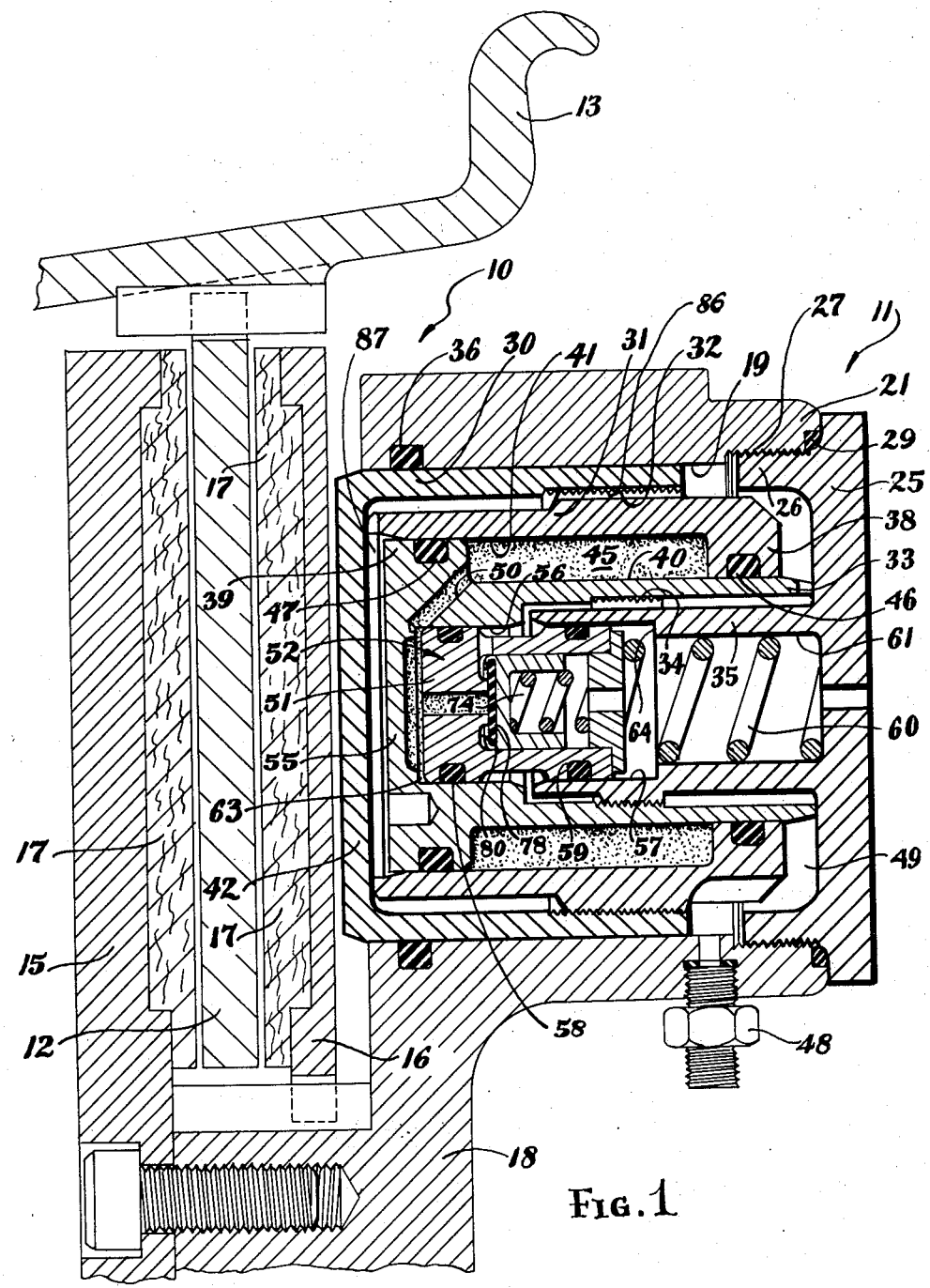

Sept. 13, 1960 B. W. OSWALT 2,952,338
HYDRAULIC BRAKE ACTUATING MECHANISM
Filed Oct. 28, 1957 2 Sheets-Sheet 2

United States Patent Office
2,952,338
Patented Sept. 13, 1960

2,952,338

HYDRAULIC BRAKE ACTUATING MECHANISM

Burlin W. Oswalt, Union, Ohio, assignor to The B. F. Goodrich Company, New York, N.Y., a corporation of New York Filed Oct. 28, 1957, Ser. No. 692,765

6 Claims. (Cl. 188—152)

This invention relates to hydraulic brakes and more particularly to improved brake actuating mechanism which is automatically adjustable to compensate for wear to thereby maintain uniform release clearance between the engageable braking members. The invention is especially useful for aircraft brakes and brakes for similar high energy service.

According to this invention a brake structure is provided embodying hydraulic actuating mechanism for engaging and releasing the brake in a manner such that a uniform braking action is obtained each time the brake is engaged, and dragging or locking of the brake is effectively prevented. The actuating mechanism incorporates into a single compact unit, a brake-actuating piston, piston-retracting means, and means for automatically adjusting the starting position of the actuating piston to maintain a uniform release clearance between the engageable braking members. The adjusting means functions entirely in response to changes in pressure and to displacement of hydraulic liquid contained within the mechanism and is positive, accurate and sensitive under all operating conditions.

A brake equipped with this actuating mechanism is effectively prevented from dragging or locking because the actuating mechanism is adapted to compensate for the so-called "transitory" slack in the brake system as well as compensating for permanent slack resulting from wear. Transitory slack in a brake system is an abnormal separation between the engageable brake members resulting from resilient deflection of the braking members and/or thermal distortion and warpage of these members when the brakes are applied. To compensate for the effects of both wear and transitory slack, the actuating mechanism is designed so that the starting position of the actuating piston is adapted for automatic adjustment hydraulically either in the direction in which it exerts actuating force or in the reverse direction as the particular operating conditions may require.

Although the actuating mechanism may be usefully employed in brakes of various design, it is particularly suitable for disc-type brakes and provides for adjustment of the actuating piston through an exceptionally long operating range. Moreover, the actuating mechanism is designed so that the entire radial area of the actuating piston may be utilized to exert actuating force. One or several individual actuating mechanisms may be used to operate a particular brake structure and where several individual mechanisms are used, each operates independently from the others, and is capable of independent replacement.

The invention will be more fully described with reference to the accompanying drawings which illustrate a disc-brake equipped with an actuating mechanism embodying the invention.

Figure 2:
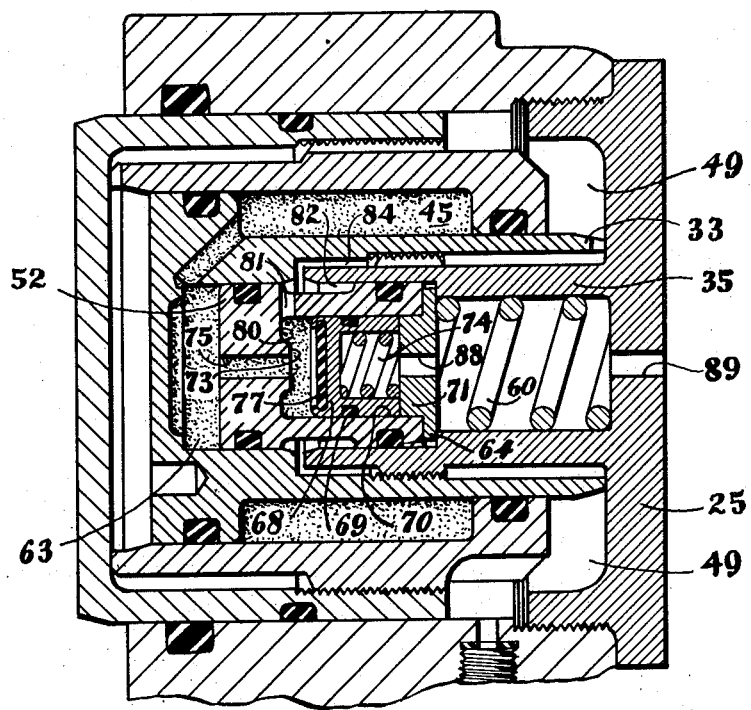

In the drawings:

Fig. 1 is a fragmentary sectional view through a disc brake showing a longitudinal axial cross-sectional view of an actuating mechanism therefor when the brake is disengaged; and Fig. 2 is a sectional view similar to Fig. 1 showing the actuating mechanism when the brake is fully applied.

In the drawings a disc brake 10 is shown embodying an actuating mechanism 11 in accordance with this invention. The brake 10 includes an annular brake disc 12 splined at its outer periphery to the rim of a wheel 13. The disc is rotatable with the wheel relative to a pair of non-rotatable annular lining carriers 15 and 16 flanking opposite sides of the disc and to each of which an annular friction lining 17 is fastened. The left carrier 15 is connected rigidly to a non-rotatable brake frame 18 which in turn is fastened to the axle structure (not shown) of wheel 13. The right carrier 16 is splined to the brake frame 18 for movement toward and away from disc 12.

The actuating mechanism 11 is housed in a cylinder 19 bored through the peripheral portion of frame 18 and functions when energized by hydraulic fluid to displace carrier 16 axailly against the disc 12 and carrier 15. Several actuating mechanisms 11 may be mounted in the brake frame 18 in the way shown in Fig. 1 and where several actuating mechanisms are used they are preferably (but not necessarily) arcuately spaced apart by equal increments and arranged concentrically about the rotational axis of the wheel and each operates independent of the others.

The actuating mechanism 11 of Fig. 1 is inserted into cylinder 19 from the rear end 21 of the cylinder (the right end in Fig. 1) and is fastened within the cylinder by an end cap 25 having a threaded flange 26 which is screwed tightly into a corresponding thread 27 in the end 21 of the cylinder. An O-ring 29 is provided at the base of the flange 26 to form a liquid-tight seal between the end cap 25 and the frame 18 at the mouth of cylinder 19. Although the actuating mechainsm 11 may be fastened in the cylinder 19 in various ways other than the manner shown in Fig. 1, the particular construction of Fig. 1 has the advantage that the mechanism 11 may be easily removed for replacement or repair without dismantling the complete brake structure.

In its structural detail, the actuating mechanism 11 comprises a cup-shaped actuating piston 30 having an interior annular barrel 31 threaded into piston at 32. The assembly of the piston 30 and barrel 31 is supported within cylinder 19 for reciprocation on a stationary central housing 33 which is fastened by threads 34 around a tube 35 projecting axially into cylinder 19 integral with end cap 25. The actuating piston 30 fits snugly within cylinder 19 and is embraced by an O-ring seal 36 embedded in the wall of cylinder 19 near its forward end to prevent leakage of hydraulic actuating liquid from the cylinder.

The assembly of the piston 30 and barrel 31 is slidably engaged with the central housing 33 by means of a radial inwardly directed flange 38 on the barrel, and by a radial outwardly directed flange 39 at the forward end of the housing. Flange 38 on the barrel embraces a smooth external cylindrical surface 40 on housing 33. Housing flange 39 engages a smooth internal cylindrical surface 41 extending axially through the barrel from its end near the front wall 42 of piston 30. The flanges 38 and 39 and the opposing concentric surfaces 40 and 41 engaged by these flanges collectively define an annular fluid chamber 45 adapted to contain an isolated volume of hydraulic actuating fluid hereinafter called the "fluid link" of the mechanism. The fluid forming this link is sealed within chamber 45 by O-ring seals 46 and 47 in flanges 38 and 39, respectively. The "fluid link" is represented in the drawings by stippling to distinguish it from the actuating hydraulic fluid introduced into cylinder 19 through connection 48 which fills space 49 behind the actuating piston 30 and barrel 31 and which is effective when pressurized to urge piston 30 toward carrier 16. Space 49 is the "inlet chamber" of the mechanism.

Annular chamber 45 containing the fluid link is in communication through a port 50 through the central housing 33 with the forward face 51 of a spool-shaped floating piston 52. The floating piston 52 is housed for axial reciprocation inside housing 33 in a cylinder defined by the forward end wall 55 and a bore 56 in housing 33, and by the forward internal surface 57 of tube 35. At the opposite ends of floating piston 52 there are O-ring seals 58 and 59 which are slidably engaged with the surfaces 56 and 57. The floating piston 52 is biased toward the left in Fig. 1 by a retractor spring 60 which is disposed in a socket 61 inside tube 35 and which urges the floating piston 52 against a seat 63 at the forward end of housing 33.

When the mechanism is operated as hereinafter explained more fully, the actuating piston 30 is urged forwardly toward carrier 16 by the fluid in inlet chamber 49 so that flange 38 of the barrel 31 displaces fluid from the fluid link chamber 45 through port 50 against the forward face 51 of the floating piston 52. Accordingly, the floating piston 52 is displaced rearwardly (rightward in Fig. 1), compressing retractor spring 60. The rearward travel of the floating piston 52 is limited by an annular shoulder 64 in tube 35. As soon as actuating fluid pressure in space 49 is relieved, spring 60 expands to move floating piston 52 back to its seat 63, thereby displacing fluid of the fluid link back into chamber 45 so that the actuating piston 30 and barrel 31 are retracted from the carrier 16. The reciprocating movements of the actuating piston 30 and the floating piston 52 are simultaneous but in opposite directions.

The starting position of the actuating piston 30 and the barrel 31 may be adjusted automatically to different locations axially along central housing 33 to compensate for wear or for deflection and warpage of the brake members by progressively changing the volume of fluid in the fluid link. To regulate the volume of the fluid link, the floating piston 52 is provided with a small cup-shaped pressure-sensing valve 68 (see Fig. 2 for numerals) having an encircling O-ring 69 and mounted in a bore 70 opening axially into the rearward end of the floating piston 52. The bore 70 is closed by a cover 71 which is maintained seated in the open end of the floating piston by the retractor spring 60. The pressure-sensing valve 68 is biased forwardly against an annular valve seat 73 on piston 52 by a valve spring 74 compressed between the valve and the cover 71. The valve 68 when in its seated position as in Fig. 1, closes a port 75 through the floating piston 52 communicating with the fluid link. To insure an adequate seal against the annular valve seat 73, the sealing face of the pressure-sensing valve 68 is preferably covered with a rubber disc 77.

The forward face of the pressure-sensing valve 68 is of greater diameter than the annular valve seat 73 so that in the seated position of the valve 68 (Fig. 1), the annular margin 78 of its sealing face serves as an actuating surface for opening the valve and is exposed to fluid in an annular recess 80 floating piston 52 around valve seat 73. This recess 80 in turn is in communication through a port 81 with an annular channel 82 encircling the center of the floating piston 52. Channel 82 is filled with hydraulic actuating fluid by a passage 84 between the junction of the central housing 33 and the tube 35 which passage leads to the inlet chamber 49 behind actuation piston 30. It may be noted that in the nonenergized condition of the mechanism as in Fig. 1, the back pressure of the hydraulic fluid system acts directly against the annular marginal surface 78 of the pressure-sensing valve 68 through passage 84, channel 82, post 81 and recess 80, and is opposed by the valve spring 74 which holds the valve closed. Similarly the system back pressure also acts against piston 30 and barrel 31 to maintain the fluid link in chamber 45 under pressure against the floating piston 52 and against the center area of the pressure-sensing valve 68 exposed through port 75.

To augment the thrusting force of the actuating piston 30, the entire cross-sectional area of the actuating piston 30 is exposed to the inlet fluid by a port 86 through the threads 32 connecting the barrel to the piston. Through this port 86 the spaces 87 between the front wall of piston 30 and the front wall 55 of the central housing 33 are filled with actuating fluid from inlet chamber 49.

There is no fluid in either the portion of bore 70 behind the pressure-sensing valve 68 or in the socket 61 in which the retractor spring 60 is located. These regions are vented to atmosphere through a port 88 in cover 71 and a port 89 in end cap 25 so that the movement of the valve 68 and piston 52 is not impeded by fluid. The rearward seal 59 on the floating piston 52 and the seal 69 around the pressure-sensing valve 68 prevents leakage of fluid into these regions, but if these seals should fail, the fluid will merely leak out through the ports 88 and 89.

The front end of actuating piston 30 is preferably not connected directly to the carrier 16 although it may be if desired. Ordinarily it is not necessary to provide for a positive retraction of the carrier 16 since the brake disc 12 will inherently float on its splined connections in separated condition from the lining carriers 15 and 16 while the brake is released. Moreover it is much easier to install and remove the actuating mechanism 11 if there is no direct connection with the carrier 16. In some types of disc brakes, it is possible to eliminate the annular carrier 16 and attach suitable linings directly to the front end of the actuating piston 30.

*Summary of operation*

To engage the brake 10 with the brake parts and actuating mechanism in the condition shown in Fig. 1, the hydraulic fluid in inlet chamber 49 inside the actuating mechanism is pressurized by a suitable pressure source such as a master cylinder (not shown). In response to such pressure, actuating piston 30 is moved forwardly against carrier 16 and barrel 31 (integral with the piston) slides telescopically forward along central housing 33 so that flange 38 of the barrel displaces part of the fluid link thru port 50 and against the forward face 51 of the floating piston 52. The floating piston 52 is therefore displaced rearwardly by the fluid link to compress retractor spring 60 until the rearward movement of the floating piston 52 is arrested by its engagement with shoulder 64 in the position shown in Fig. 2. The actuating mechanism 11 is so designed that the actuating piston 30 will be extended to exert full braking pressure against carrier 16 at substantially the same instant the floating piston 52 engages stop shoulder 64.

Throughout the period required to displace floating piston 52 rearwardly to shoulder 64, the pressure-sensing valve 68 remains closed on port 75 so that up to this point in the operation the volume of liquid of the fluid link remains unchanged. Part of the fluid link is merely displaced from chamber 45 into bore 56 in front of floating piston 52 to move piston 52.

When the actuating piston firmly engages the carrier 16 with the brake disc 12 and carrier 15, the pressure of the hydraulic fluid in inlet chamber 49 builds up rapidly to the full line pressure of the pressure source. Accordingly the full line pressure then is communicated to the marginal surface 78 of the face of valve 68 (through port 81, channel 82, and passage 84) and the resulting force overcomes valve spring 74 to displace valve 68 rearward and open port 75. In Fig. 2 the pressure-sensing valve 68 is shown fully open, and valve 68 stands fully open throughout a period in which the brake is engaged. When the pressure-sensing valve 68 is first opened, however, ordinarily there will be no flow of fluid through port 75 because at this period in the operation the fluid link will be at the same pressure as the actuating fluid of inlet chamber 49.

If the brake is now disengaged before any significant lining wear or heating occurs the pressure-sensing valve 68 immediately snaps closed against seat 73 as soon as the line pressure in inlet chamber 49 is relieved, thereby trapping the original volume of fluid in the fluid link. Then retractor spring 60 forces floating piston 52 leftward to its seat 63 (in Fig. 1). The return movement of piston 52 displaces the portion of the fluid link ahead of it through port 50 into chamber 45 and in turn the fluid thus entering chamber 45 retracts the barrel 31 and actuating piston 30 to their original positions on central housing 33. In this type of operation the volume of the fluid link remains unchanged.

In a high energy braking stop such as for landing an airplane, an appreciable thickness of the linings on carriers 15 and 16 may be progressively worn away while the brake is engaged. Since the actuating piston 30 is exposed directly to full line pressure while the brake is engaged, however, the actuating piston 30 (together with barrel 31) will be advanced progressively forward relative to the housing 33 as wear occurs to maintain full braking pressure. As the actuating piston 30 is so advanced to compensate for wear, a volume of the fluid link proportional to the thickness of the linings worn away is displaced by flange 38 of barrel 31 thru port 50 into bore 56. Inasmuch as the floating piston under these conditions is bottomed on shoulder 64 and the pressure-sensing piston is open as in Fig. 2, this displaced portion of the fluid link is forced through port 75 and past valve 68 through passage 84 into inlet chamber 49. The fluid link is thus reduced in volume.

Thereafter, when the inlet fluid pressure is relieved to release the brake, the pressure-sensing valve 68 instantly snaps closed as in the previous case. But now a smaller volume of liquid exists in the fluid link. Therefore, as the retractor spring 60 expands to return floating piston 52 to its Fig. 1 position, the actuating piston 30 and barrel 31 are retracted to a new starting position ahead or forward of their original one on central housing 33. The distance thru which the starting position of the actuating piston is thus advanced is sufficient to compensate for the wear which may have occurred in the linings.

Inasmuch as the floating piston 52 is moved a uniform distance from shoulder 64 to shoulder 63 to retract the actuating piston 30, it is evident that the actuating piston 30 is therefore also always retracted a uniform distance from the particular position it occupies at the moment the brake is released, regardless of the distance the actuating piston may have been advanced to compensate for wear while the brake is engaged. The "release clearance" of the actuating piston 30 is the length of this retraction stroke and it is thus proportional to the distance the floating piston 52 may be displaced axially between shoulders 64 and 63. The ratio of the retraction stroke of actuating piston 30 to the stroke of floating piston 52 is equal to the ratio of the area of the floating piston 52 to the radial area of the flange 38 of the barrel 31. Using this relationship, the designer may adjust the distance between shoulders 63 and 64 so that the mechanism will operate with a particular desired release clearance.

From the foregoing discussion it is evident that as wear occurs on the linings 17 during successive applications of the brake, the starting position of the actuating piston 30 will be advanced progressively forward on housing 33 toward the lining carriers, and the volume of the fluid link will be progressively reduced to compensate for the wear. The pedal action of the brake system will thus remain uniform.

The forward travel of the actuating piston 30 is limited only by the distance between the flanges 38 and 39. This distance can be varied widely by the designer to provide a suitable adjustment range for the actuating piston. The mechanism may be designed in a useful practical size (e.g. with an actuating piston 30 of about three inches in diameter) but so that the total available adjustment range of piston 30 is as much as one inch or more. Thus this actuating mechanism is especially suitable for disc type brakes although it is also suitable for drum brakes.

In a braking application in which the brake frame 18 is resiliently deflected away from the carriers as a result of the braking force exerted by the actuating piston 30, and/or if the carriers and disc 12 tend to warp because of heating, the actuating piston 30 will be stepped forward progressively to maintain braking pressure in the same manner in which piston 30 is advanced to compensate for wear. Upon release of actuating pressure after such an occurrence, however, the spring back of the brake parts may radically reduce the desired release clearance, and under these circumstances, the actuating mechanism 11 will be then in the so-called "over adjusted" condition. The over adjustment may be severe enough in some cases to cause the linings to drag against the disc or to tend to lock the brake.

With the mechanism 11, over adjustment can be corrected and the desired release clearance automatically restored by merely depressing the brake pedal momentarily after the brake parts have regained their normal positions. During a reset depression of the brake pedal, the actuating mechanism 11 functions automatically to increase the volume of fluid in the fluid link sufficiently so that when the pedal is thereafter released the actuating piston 30 is again retracted to the release clearance desired. Ordinarily, in an aircraft brake, over adjustment may occur when the brakes are applied during a landing, and with this mechanism 11 the condition can be automatically remedied the first time the brake pedal is depressed while the aircraft taxies to its parking place.

When the brake is actuated to reset the release clearance while the mechanism is "over adjusted," the pressure of the inlet chamber fluid urges actuating piston 30 against the lining carrier 16 in the same manner previously explained. However, since the actuation stroke of the actuating piston 30 under these conditions will be shorter than normal, the piston 30 will reach a position in which it is pressing on carrier 16 with full braking pressure substantially before floating piston 52 is displaced to shoulder 64. However, even though floating piston 52 is only part way through its full stroke at this period in the operation, the pressure of the inlet hydraulic actuating fluid inside chamber 49 will rise to full line pressure to force open the pressure-sensing valve 68 as soon as actuating piston 30 is firmly engaged with carrier 16. Since the area of the forward face 51 of the floating piston 52 against which the pressure of the fluid link acts is slighly greater than the area of its opposing surfaces exposed to fluid in channel 82 and recess 80, there will be a resultant force proportional to this difference in area acting on the forward face 51 of the floating piston 52 sufficienct to overcome the opposing spring force of retractor spring 60. Accordingly, the floating piston 52 is displaced rearwardly while the brake remains applied until it bottoms against shoulder 64 in the position shown in Fig. 2. While the floating piston 52 is thus displaced toward shoulder 64, fluid from inlet chamber 49 flows in a counter direction through port 75 thereby increasing the volume of the fluid link. Subsequently when the inlet fluid pressure is relieved, the pressure sensing valve 68 instantly snaps closed on port 75, trapping the added volume of fluid in the fluid link. Thereafter, during the subsequent return movement of piston 52 to shoulder 63, piston 30 is retracted an additional distance on housing 33 corresponding to the new volume of fluid in the fluid link. In such manner the predetermined release clearance for which the mechanism is designed is automatically restored.

It is not possible for a brake embodying the actuation mechanism 11 to become locked regardless of the axial force exerted by carrier 16 on the actuating piston 30, because piston 30 is free to yield rearwardly against the low back pressure of the hydraulic fluid in inlet chamber 49 to relieve such force. If such rearward movement of the piston 30 should result in an appreciable pressure increase in the fluid in inlet chamber 49, the inlet fluid will eventually force open the pressure-sensing valve 68 and cause some of the fluid in inlet chamber 49 to flow through port 75 into the fluid link and thus neutralize the axial force on piston 30. Thus, regardless of the extent to which the brake may become over adjusted, at most the linings will be in light dragging engagement with the brake disc 12 and on the first actuation of the brake after such over adjustment occurs, the desired release clearance is automatically restored.

The mechanism 11 is particularly designed so that if there is any mechanical failure of the floating piston 52 or of the pressure-sensing valve 68 to operate properly, the actuating piston 30 is still operable to exert braking force. Under these circumstances the actuating piston merely may not retract for the full release clearance.

Variations in the preferred construction disclosed in the foregoing may be made within the scope of the appended claims.

I claim:

1. In a brake mechanism embodying engageable relatively rotatable braking members, a cylinder in one of said members, a tubular housing secured in said cylinder and having a closed end directed toward said braking members, a brake-actuating piston in said cylinder including a skirt portion telescopically surrounding said closed end of the housing in sealing engagement, said actuating piston being operative in response to actuating fluid pressure in said cylinder to engage said braking members, a chamber between and defined by said housing and said skirt portion, a passage from said chamber into the interior of said housing near said closed end of said housing, a floating piston inside said housing, said floating piston cooperating with said chamber through said opening to contain a fluid link isolated from the actuating fluid for said actuating piston, means biasing said floating piston against said fluid link and acting through the agency of said fluid link to bias said actuated piston to a retracted position on said housing when said actuating fluid is released, said floating piston being movable in a direction opposite to said actuated piston by the movement of said actuating piston and the displacement of said fluid link in response to actuating fluid pressure in said cylinder to engage the brake, and valve means carried by said floating piston for controlling flow of fluid into and out of said chamber for regulating the volume of fluid in said fluid link to compensate for wear and/or changes in the normal locations of said braking members.

2. Mechanism in accordance with claim 1 wherein said valve means includes means communicating said valve means with said actuating fluid and wherein the valve means is operable to open in response to a predetermined pressure of fluid in either said fluid link or said actuating fluid for operating said actuating piston.

3. Mechanism in accordance with claim 2 wherein said floating piston has an effective surface exposed to said fluid link of greater area than an opposing effective surface thereof exposed to said actuating fluid in said cylinder for operating said actuating piston.

4. Mechanism in accordance with claim 2 wherein said housing includes stop means so that the floating piston is movable reciprocatively between preselected limits when the brake is engaged or disengaged to provide a corresponding preselected uniform retraction stroke for said actuated piston.

5. Brake actuating mechanism comprising a tubular housing having a closed end portion, an actuating piston having a skirt portion telescopically surrounding said closed end portion of said housing in axial relation, said housing and said actuating piston being adapted for reception in a cylinder in a brake frame with said housing stationarily secured in the cylinder and said piston reciprocative therein in response to actuating fluid in the cylinder, said skirt portion and said housing defining an annular fluid chamber to contain a fluid link, a passage near the closed end of said housing connecting said chamber with the interior of the housing, a floating piston inside the housing and stop means in the housing restricting movement of the floating piston between a predetermined retracted and extended position, said floating piston being exposed to the portion of the fluid link inside the housing, means biasing said floating piston to its retracted position, said floating piston being movable simultaneously with said actuating piston but in the opposite direction in said housing to displace said fluid link through said passage from said chamber into the housing and vice versa without altering the volume of the fluid link in response to pressurization and release of pressure in the actuating fluid for the actuating piston, and said floating piston having a predetermined retraction stroke thereby restricting the actuating piston to a corresponding uniform retraction stroke through the agency of said fluid link, and valve means in said floating piston adapted for communication with actuating fluid for said actuating piston and operable to open in response to either a predetermined pressure in said fluid link or in said actuating fluid to communicate said fluid link and said actuating fluid and vary the volume thereof to vary the starting position of said actuating piston relative to said housing.

6. A brake actuating mechanism comprising a tubular housing adapted for attachment to a brake frame, an actuating piston connected to the tubular housing for longitudinal slidable movement thereon in response to hydraulic actuating fluid, a floating piston inside the housing, said housing defining with said pistons respectively a sealed chamber externally of the housing and a sealed chamber internally of the housing jointly adapted to contain a fluid link isolated from said hydraulic actuating fluid, a passage through said housing connecting said chambers and through which said fluid link is displaceable from one chamber to the other upon reciprocation of said pistons, a spring biasing said floating piston against the portion of said fluid link contained in the chamber inside the housing, said pistons being movable in opposite directions relative to each other and the housing in response to either actuating fluid or said biasing spring with corresponding displacement of said fluid link between said chambers without altering the volume of said fluid link, stop means in said housing limiting said floating piston to a predetermined uniform retraction stroke thereby restricting said actuating piston to a uniform retraction stroke through the agency of said fluid link, and valve means carried by said floating piston and having a pressure-responsive area therein in communication with actuating fluid for said actuating piston, said valve means being normally closed and being responsive to a predetermined pressure of either said fluid link or said actuating fluid to open and thereby communicate said fluid link and said actuating fluid for varying the volume of said fluid link to compensate for variation in the actuation stroke of said actuated piston from said uniform retraction stroke thereof.

References Cited in the file of this patent

UNITED STATES PATENTS

| | | |
|---|---|---|
| 2,193,190 | Colman | Mar. 12, 1940 |
| 2,815,830 | Oswalt | Dec. 10, 1957 |
| 2,817,419 | Wolf | Dec. 24, 1957 |
| 2,817,421 | Bricker | Dec. 24, 1957 |